No. 876,214. PATENTED JAN. 7, 1908.
J. H. MORRIS.
VEHICLE WHEEL.
APPLICATION FILED JUNE 15, 1906.
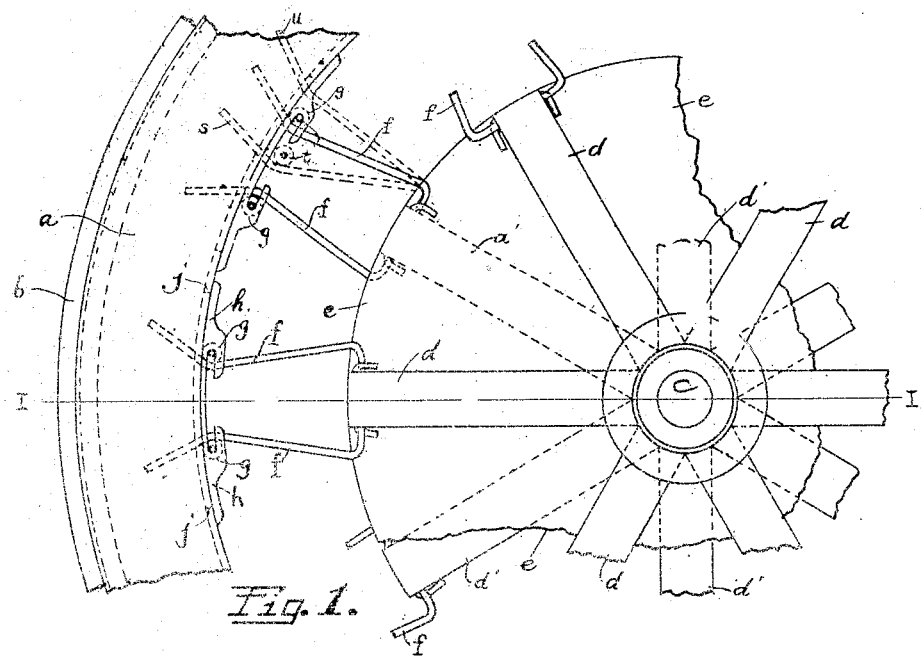
Fig. 1.
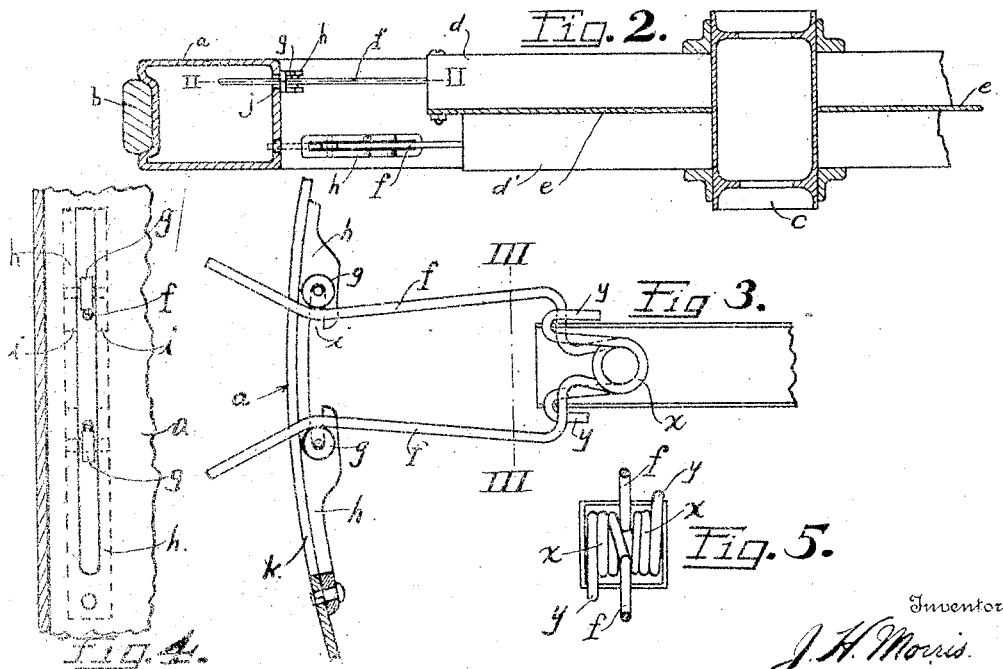
Fig. 2.
Fig. 3.
Fig. 4.
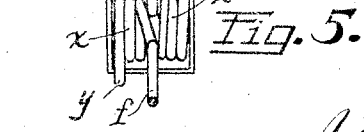
Fig. 5.
Witnesses
R. E. Hamilton
J. H. Benedict
Inventor,
J. H. Morris.
By Higdon & Higdon
Attorneys

UNITED STATES PATENT OFFICE.

JOHN H. MORRIS, OF OMAHA, NEBRASKA.

VEHICLE-WHEEL.

No. 876,214.  Specification of Letters Patent.  Patented Jan. 7, 1908.

Application filed June 15, 1906. Serial No. 321,864.

*To all whom it may concern:*

Be it known that I, JOHN H. MORRIS, a citizen of the United States, residing at Omaha, in the county of Douglas and State of Nebraska, have invented certain new and useful Improvements in Vehicle-Wheels, of which the following is a specification.

My invention relates to vehicle wheels, and is an improvement on and supplemental to Letters Patent # 643724 issued me Feb. 20, 1900, and relates more especially to that class in which the hub or central portion is eccentric of the rim or outer section when the wheel is in use, said outer section being yieldingly connected to the hub for the purpose of reducing the vibration and insuring the increased speed, because of the resilient properties of the wheel; and the object is to provide a wheel of this character of light construction which is simple, strong, reliable, inexpensive to manufacture and in which the wearing parts are easily and quickly replaced by the use of simple tools. I obtain these objects by the novel arrangement of peculiarly shaped springs which will be herein described and claimed and which are fully illustrated in the accompanying drawings, in which—

Figure 1 represents in side elevation a part of a wheel constructed in accordance with my invention. Fig. 2 represents a section on the line 1—1 in Fig. 1. Fig. 3 represents an enlarged section taken on the line 11—11 in Fig. 2. Fig. 4 is an enlarged detail section showing a portion of the rim of the wheel with an opening therein, through which the arms of a coil spring operate. Fig. 5 represents a cross section on the line 111—111 Fig. 3.

In the drawing $a$ represents the hollow rim of the wheel on which is shown a tire $b$ preferably of solid rubber, while $c$ represents the hub of the wheel which may be of any preferred shape.

$d$ and $d'$ indicate the hollow spokes of the wheel, all of which are rigidly connected to the hub $c$ and to each other by means of a circular plate or disk $e$ arranged in contact with each spoke and to which said spokes are securely fastened.

The inner section of the wheel consisting of the hub and spokes, is yieldingly connected to the outer section or rim by means of the long arms $f$ of the coil springs $x$, whose short arms $y$ are hooked to the edge of the hollow spokes $d$ and bear against the same, each spring being independent of its mate or opposite. The long arms $f$ of the coil springs $x$ extend outward from the ends of the spokes $d$ and $d'$, and engage against anti-friction rollers $g$ journaled in brackets $h$, rigidly secured to the inside of the hollow rim $a$, and the outer ends of said arms $f$ extend through slots $j$ formed in the rim $a$, beneath each of the brackets $h$.

It will be observed that weight upon the hub $c$, such as would occur on the wheel while in use, would cause the hub portion of the wheel to move downwardly and become eccentric of the outer section and the arms $f$ of the springs $x$ at the top of the wheel would be drawn downward between the rollers $g$ and the reverse operation would occur to the springs at the lower portion of the wheel, the outer ends of the arms $f$ being moved into the rim $a$. It will be observed that, when a pair of the spring arms $f$ are moved downward between the rollers $g$ and from the rim $a$, the spring arms $f$ will be bent closer together because of the angularity of the portions of the spring arms which rest normally within the hollow rim $a$. It will also be observed that the spring arms of the lower spokes of a wheel will also be bent toward each other when pressed farther into the rim $a$ because of the angularity of the portions of the arms $f$ normally outside the roller $a$. Thus it will be seen that the tendency of the hub to assume an eccentric position within the wheel is resisted by the coil springs $x$ both at the top and bottom of the wheel and that the springs, aided by the friction between the springs and the rollers $g$, will tend to return the hub at once to its concentric position. This tendency to return the hub to its concentric position is assisted also, by the spring arms $f$ at the ends of the horizontal spokes and in part by each spring in the wheel, as the weight on the hub, the lower down by the weight on the hub, the lower arms of each pair of springs carried by the horizontal spokes are bent and tend to lift up and return the hub $c$ to its concentric position.

It will be observed by reference to Fig. 2 that the spokes are staggered and form two rows about the hub $c$, thus bracing each side of the rim $a$ from the hub $c$, and, together with the stiffness of the wires $f$, preventing any possibility of the rim $a$ being pushed out of the same vertical plane occupied by the hub and spokes.

The rollers g are retained in journal slots i by the tension of the spring arm f and are easily removable by bending the spring arm f back as shown by dotted line s in Fig. 1, and allowing the roller to pass out at the open end of slot i as shown at t in Fig. 1. After removing the roller g as above and releasing the spring arm f, said spring arm will lie dormant in the end of slot j as shown at u in Fig. 1 and will be easily removed from the wheel by lifting it out of the hollow spoke and then drawing the end from the hollow rim a.

It will thus be observed that I have produced a wheel which will cause the minimum of delay due to breakage of its parts, as the loss of three or four springs x would not impair the wheel materially, and I have shown that each spring and roller is easily removed and replaced, thus causing only a moment's delay in repairing a break at any distance from a repair shop. Thus it will be seen that I have produced a simple strong and reliable wheel of the class described and light in construction, whose parts are easily interchangeable.

I claim:—

1. A vehicle wheel, comprising a tubular rim, a hub, a disk fixed thereto, hollow spokes fixed to the hub and disk, a pair of springs detachably fixed to the outer end of each spoke and being yieldingly attached to the hollow rim.

2. A vehicle wheel, comprising a hollow rim, a hub, a disk fixed thereto, hollow spokes fixed to the hub and disk, a pair of springs detachably fixed to the outer end of each spoke, the outer ends of which springs extend into the hollow rim, and anti-friction rollers arranged on the hollow rim for engaging the springs.

3. A vehicle wheel comprising an outer section upon the inner side of which are arranged anti-friction bearings in pairs, an inner section upon which are mounted in pairs a series of coil springs having long bent arms which bear upon said antifriction bearings of the outer section and yieldingly retain the inner section concentric of the outer section and all of which arms offer resistance to any force tending to destroy the concentricity of the sections.

4. A vehicle comprising a hollow outer section upon the inner side of which are arranged anti-friction bearings in pairs and openings opposite them, an inner section upon which are mounted in pairs, a series of coil springs, having long bent arms which bear upon said anti-friction bearings of the outer section, and pass through the openings into the hollow rim and which yieldingly retain the inner section concentric of the outer section and all of which arms offer resistance to any force tending to destroy the concentricity of the sections, substantially as described.

5. A vehicle wheel comprising a hollow outer section upon the inner side of which ir open slots are arranged anti-friction bearings in pairs, and openings in the rim opposite the pairs in the form of long slots, an inner section upon which are mounted in pairs, a series of coil springs, having long bent arms, which bear upon said anti-friction bearings of the outer section, and whose extreme ends pass through the slots into the hollow rim of the outer section and which yieldingly retain the inner section concentric of the outer section and all of which arms offer resistance to any force tending to destroy the concentricity of the sections substantially as described.

In testimony whereof I affix my signature in presence of two witnesses.

JOHN H. MORRIS.

Witnesses:
ROYAL A. STREETER,
CHARLES A. SWEET.